US007925706B2

(12) United States Patent
Glickstein

(10) Patent No.: US 7,925,706 B2
(45) Date of Patent: Apr. 12, 2011

(54) FILTERING ELECTRONIC MESSAGES

(75) Inventor: Robert S. Glickstein, San Rafael, CA (US)

(73) Assignee: Microsoft Corporation, Redmond, WA (US)

( * ) Notice: Subject to any disclaimer, the term of this patent is extended or adjusted under 35 U.S.C. 154(b) by 536 days.

(21) Appl. No.: 11/449,169

(22) Filed: Jun. 7, 2006

(65) Prior Publication Data

US 2009/0132658 A1     May 21, 2009

(51) Int. Cl.
*G06F 15/16*     (2006.01)
(52) U.S. Cl. .................................................. 709/206
(58) Field of Classification Search .................. 709/206
See application file for complete search history.

(56) References Cited

U.S. PATENT DOCUMENTS

| | | | |
|---|---|---|---|
| 6,505,236 B1 * | 1/2003 | Pollack | 709/206 |
| 7,380,126 B2 * | 5/2008 | Logan et al. | 713/176 |
| 2004/0258044 A1 * | 12/2004 | Girouard et al. | 370/352 |
| 2005/0010573 A1 * | 1/2005 | Garg | 707/10 |
| 2005/0251861 A1 * | 11/2005 | Cunningham et al. | 726/23 |
| 2007/0011324 A1 * | 1/2007 | Mehr et al. | 709/225 |

* cited by examiner

*Primary Examiner* — Phuoc Nguyen
*Assistant Examiner* — Clarence John

(57) ABSTRACT

A method for handling electronic messages comprising: determining if a stored email addressed to a user includes an identifier; determining by an email server if an email addressed to a user includes an identifier; determining if the identifier is valid upon determining the email includes the identifier; and filtering the email upon determining either the email does not include the identifier or the identifier is not valid.

13 Claims, 8 Drawing Sheets

| User ID Code | Device ID Code | User Name | Online Status | SIM IDs |
|---|---|---|---|---|
| 6600983373 | 8879987283 | JohnDoe | Offline | 1231234 1232389 |
| 6093827280 | 8897728736 | JackLambert | Online Dispatcher 208 | 3379817 |
| 6827729873 | 8892738270 | TomWebster | Offline | 2231212 |
| ------ | ------ | ------ | ------ | ------ |

| 301 | 302 | 303 | 304 | 305 |

*Fig. 3A*

| User ID Code | User Name | SPAM filtering | Picture Attachment Format | Video Attachment Format |
|---|---|---|---|---|
| 660098373 | JohnDoe | Yes | JPEG (640X 480) | MPEG |
| 693382728 | JackLambert | Yes | none | none |
| 682729873 | TomWebster | No | Original | Original |

*Fig. 3B*

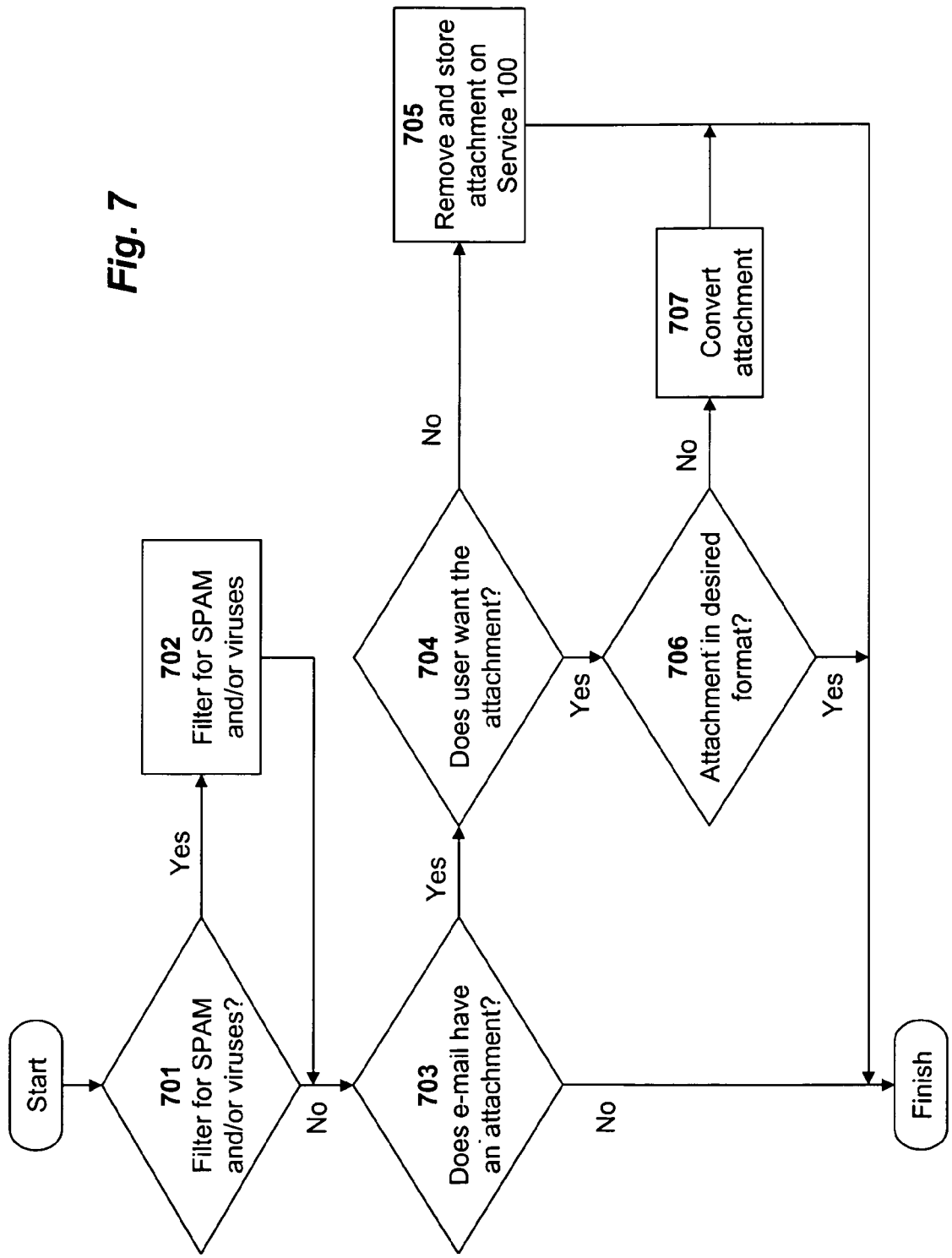

US 7,925,706 B2

FILTERING ELECTRONIC MESSAGES

TECHNICAL FIELD

This application relates generally to the field of data processing systems, and more particularly to an architecture for filtering electronic messages.

BACKGROUND

Virtually everyone relies on e-mail for personal and/or business communications. Thus, a plethora of e-mail servers, such as those made by Oracle® and IBM®, exist for local clients to handle transferring e-mails from one client to another. In addition, a variety of free e-mail servers exist over the Internet (e.g., Yahoo®, Google® Mail, and Hotmail®) that allow clients to send and receive e-mail through web browsers. In many instances, to send mail from one client to another, the e-mail must pass between different e-mail servers. For example, an e-mail originating on the Hotmail® server and addressed to a client on a Yahoo® server must pass from the Hotmail® server to the Yahoo® server.

In addition, many e-mail users today rely on hand-held wireless devices such as cellular telephones, Personal Digital Assistants (PDAs), and multipurpose devices which perform the functions of both cellular telephones and PDAs such as the T-Mobile Sidekick and Sidekick 2 designed by Danger, Inc., the assignee of the present application.

Certain wireless devices such as the Sidekick allow users to retrieve email messages from a variety of different e-mail accounts (e.g., Hotmail, Yahoo, etc). In the case of the Sidekick, for example, the data processing service over which the Sidekick operates is capable of retrieving and processing messages from these external e-mail accounts on behalf of the user.

Because of the proliferation of SPAM, viruses, and malware in today's technology, when an e-mail message is transferred from one service to another, the service may perform certain functions on the e-mail, such as filtering for SPAM and viruses. For some services, an e-mail may pass through multiple filters.

One problem which exists With this configuration is that, when multiple filters exist, all of the filters may not be necessary for a particular e-mail message. Another problem which exists with this configuration is that changes wrought by the filters may require a message to be re-filtered from the beginning. Given the large number of email messages processed by the data processing service, it is important to avoid redundant filtering since it may place a significant computational strain on the service.

To further exacerbate the problem, a process of removing unnecessary and/or redundant filtering must be secure so that senders of SPAM, unsolicited e-mails, and viruses are not able to exploit the process in order to circumvent filtering altogether (and thereby cause harm to a hand-held wireless device).

SUMMARY

A method for handling electronic messages is described. One embodiment of the method comprises: determining by an email server if an email addressed to a user includes an identifier; determining if the identifier is valid upon determining the email includes the identifier; and filtering the email upon determining either the email does not include the identifier or the identifier is not valid.

BRIEF DESCRIPTION OF THE DRAWINGS

A better understanding of filtering electronic messages can be obtained from the following detailed description in conjunction with the following drawings, in which:

FIG. 3A illustrates a user to device mapping for transmitting e-mail to a user via the user's device.

FIG. 3B illustrates a user preference mapping for determining what type of filtering should be performed on an e-mail and/or its attachments for a specific user.

FIG. 7 illustrates one embodiment of filtering the e-mail within the procedure of FIG. 6.

DETAILED DESCRIPTION

Described below is an apparatus and method for handling electronic messages on an e-mail service. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Figure 1:
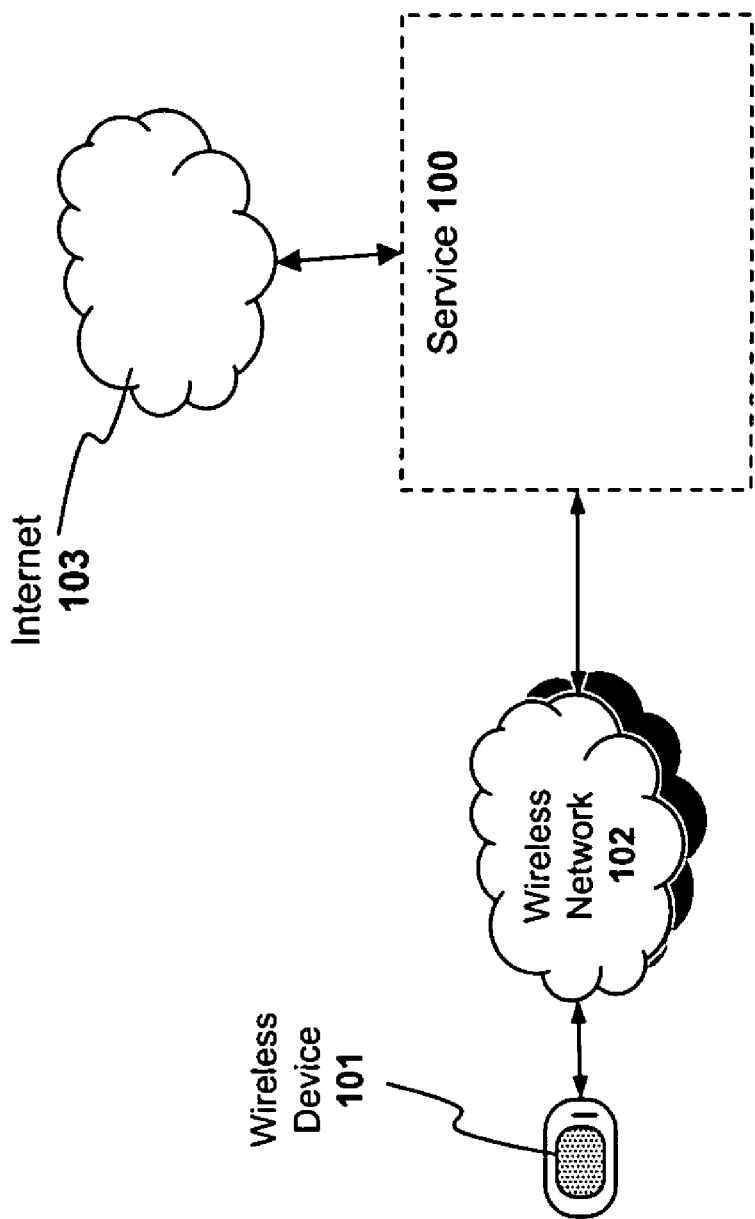
FIG. 1 illustrates a connection between a hand-held wireless device and service.

Embodiments of the invention may be implemented on a data processing service 100 such as that illustrated generally in FIG. 1. In one embodiment, the service 100 acts as a proxy between a wireless data processing device 101 and any external servers with which the service 100 communicates via the internet 103 (e.g., e-mail servers, Web servers, etc). For example, e-mail may be retrieved from the Yahoo® e-mail server through the internet 103 by the service 100 and forwarded to the wireless data processing device 101 through the wireless network 102. One embodiment of the service 100 is described in the U.S. patent entitled PORTAL SYSTEM FOR CONVERTING REQUESTED DATA INTO A BYTECODE FORMAT BASED ON PORTAL DEVICE'S GRAPHICAL CAPABILITIES, Ser. No. 09/714,897, Filed Nov. 15, 2000 (hereinafter "Network Portal Application"), which is assigned to the assignee of the present application and which is incorporated herein by reference.

Figure 2:
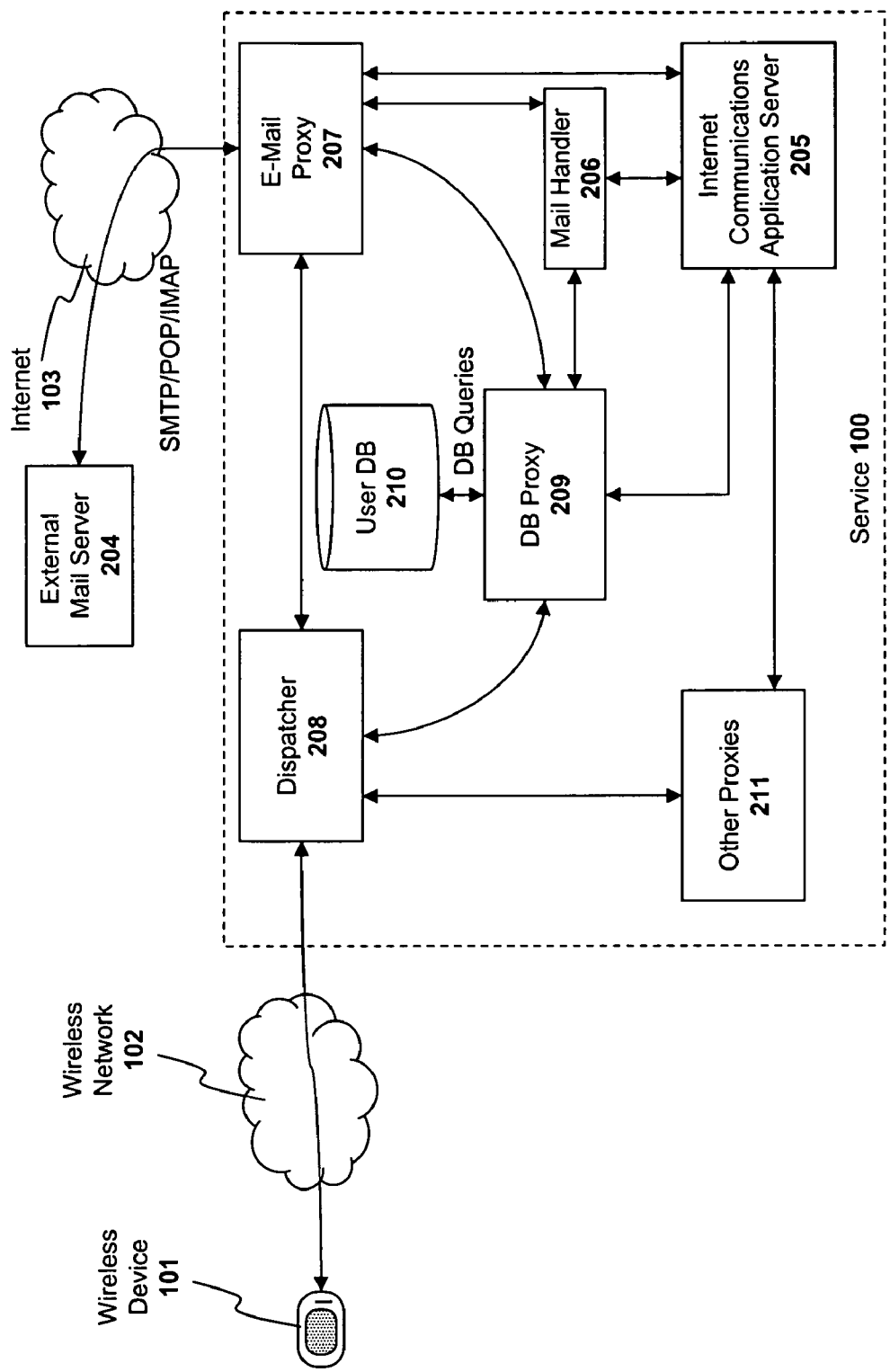
FIG. 2 illustrates an embodiment of the architecture of the invention as it relates to FIG. 1.

Referring to FIG. 2, an exemplary architecture of the service 100 in relation to the present invention is illustrated. This embodiment is comprised generally of a user database 210, a database proxy server 209 for accessing the user database 210, an e-mail server 205, a dispatcher server 208, and a mail handler 206. In addition, the service may further include other proxies 211. It should be noted that other components may be included and/or substituted in the illustrated architecture of the service 100 while still complying with the underlying principles of the invention. For example, although one dispatcher 208 is shown in FIG. 2, multiple dispatchers 208 may be necessary to handle connections for a multitude of devices 101 connected to the service 100.

In addition, as illustrated in FIG. 3B, the user database 210 may contain a table indicating a set of filtering preferences for each user. For example, the user ID 306 and user name 307 is associated with an indication as to whether the user wants e-mail messages filtered for SPAM (308), and the format in which the user wishes to receive picture attachments (309) and/or video attachments (310). In the illustrated example, user John Doe selects SPAM filtering, requests the service 100 to convert picture attachments to JPEG format of 640× 480 pixels, and requests the service 100 to convert video attachments to MPEG format. Meanwhile, Jack Lambert selects SPAM filtering but requests the service to not forward any attachments to his device (thus stripping the attachments and storing them on the service 100). It can be appreciated that a multitude of user preferences may be incorporated into a user preference mapping illustrated in FIG. 3B including, for example, audio format, length of e-mail messages, priority level (i.e., only allowing messages above a specified priority threshold to be transmitted to the device), virus filtering, and a defined level of SPAM and/or virus filtering to be performed on incoming messages. In addition, the service may log the user's device limitations and thus adjust e-mail and attachment formatting requirements accordingly to allow the device 101 to handle all incoming e-mail.

Embodiments of the present invention for handling e-mails may be implemented on any e-mail server, such as Hotmail®, Yahoo®, or Danger's® e-mail service. Therefore, although the forthcoming example embodiment is in relation to a service for wireless data processing devices, the invention should not be limited to any specific platform, service, or described embodiment.

Referring to FIG. 2, in one embodiment, the e-mail server 205, communicably coupled to the database proxy 209, retrieves e-mail from an external mail server 204. An exemplary e-mail server is an Internet Communication server such as CommuniGate Pro® Internet Communications Application server by Stalker Software Systems, Inc. While the e-mail server 205 is in possession of the e-mail, the e-mail server 205 may have the inbound mail handler 206 filter the e-mail and/or any attachments by providing, but not limited to, SPAM filtering and virus filtering. In addition, the e-mail server 205 may strip and send e-mail attachments to the database proxy 209 to store on the user database 210, and/or convert attachments to a user specified format. In one embodiment of the present invention, the e-mail server 205 queries the database proxy 209 for the user preference mapping (illustrated in FIG. 3B; retrieved from the user database 210) in order to determine specific filtering to be performed on the e-mail. One method and embodiment of stripping and/or converting attachments before sending an e-mail to a wireless device is described in co-pending application entitled A SYSTEM AND METHOD OF DISTRIBUTING A FILE BY EMAIL, Ser. No. 10/236,255, Filed Sept. 13, 2001 (hereinafter "File Distribution Application"), which is assigned to the assignee of the present application and which is incorporated herein by reference.

In one embodiment of the present invention, the mail handler 206 determines whether an e-mail and its attachments need to be filtered. In one embodiment, in order to determine whether an e-mail needs to be filtered, the mail handler 206 searches for an identification code (hereinafter "identifier") in the e-mail, and if found, validates the identifier to determine whether the e-mail requires filtering by the inbound mail handler 206. An identifier may be created and attached by the mail handler 206 as described below.

Figure 4:
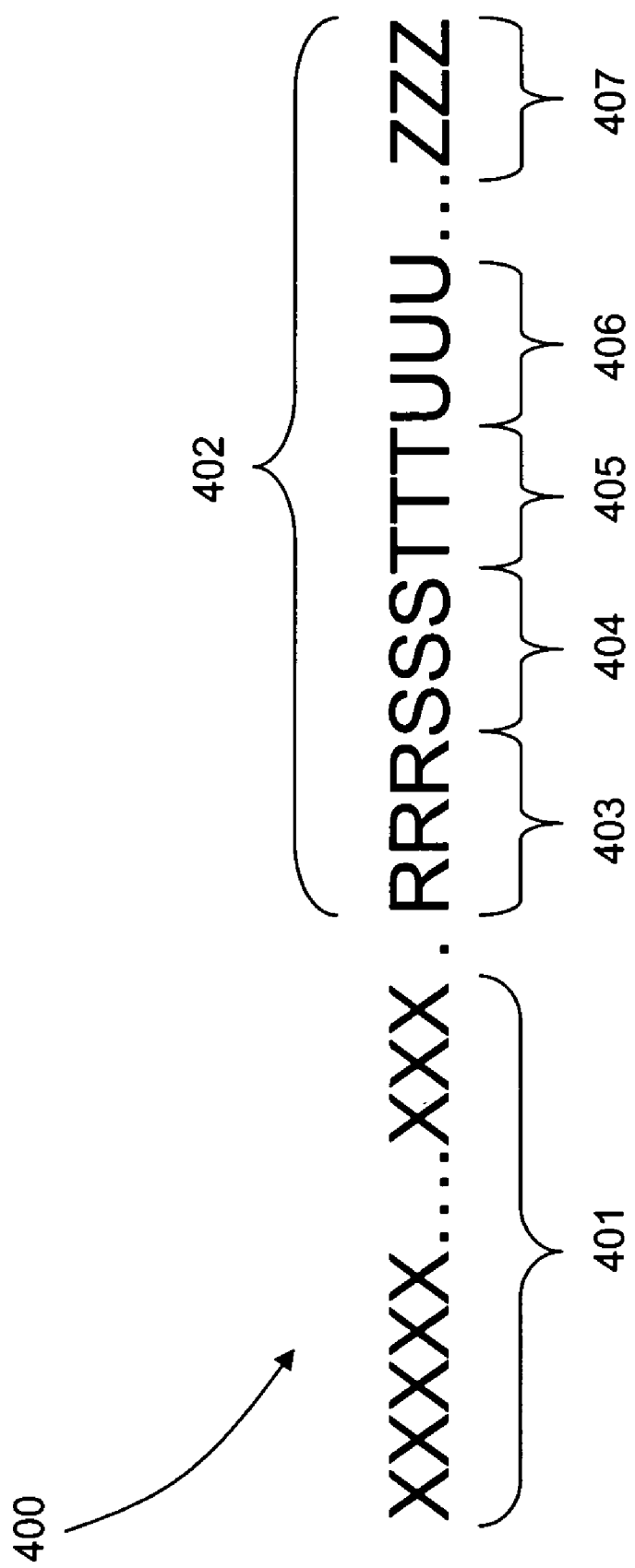
FIG. 4 illustrates an exemplary embodiment of an identifier.

In one embodiment of the invention, the identifier is two strings inserted into the header of the e-mail, as illustrated in FIG. 4. To prevent hackers from inserting a "counterfeit" identifier (i.e., an identifier not generated by the service 100) into an e-mail before the e-mail is received by the service 100, a unique marker 401 is included within the identifier 400. In one embodiment, the marker 401 is a random number generated by the mail handler 206. A random number is secure because a hacker is unable to predict the generated number. It will be recognized, though, that other ways to create a secure identifier 400 exist, and the present invention is not limited to the disclosed embodiment. For example, the marker 401 may be a confidential code used only internally on the service 100 (hence, not known to persons outside the service 100). In another example, the marker 401 is a generated random number cryptographically combined with details extracted from the message.

The other portion of the identifier 400 illustrated in FIG. 4 is a user preference string 402 that contains information related to user preferences (as specified in the user preference mapping illustrated in FIG. 3B). In one embodiment, the identifier 400 may also include a user-id, which may be an internal number assigned by the service or determined by looking up the recipient email addressing the database. Thus, in the example embodiment, bits 403 symbolize the level of SPAM filtering to be performed, bits 404 symbolize the format and dimensions of converted picture attachments, and bits 405 symbolize the format and dimensions of converted video attachments. It will be appreciated that other preferences may be coded in the user preference string 402 including, but not limited to, audio format requirements 406, preferred virus filtering 407, and an indication as to whether attachments should be stored on the service 100 (not shown). Moreover, various alternate formats for the identifier may be used including, for example, predefined flags embedded into e-mail content or an identifier that includes just a marker for validity purposes, such as a hash code or a unique encryption that signifies the validity of the identifier.

Figure 5:
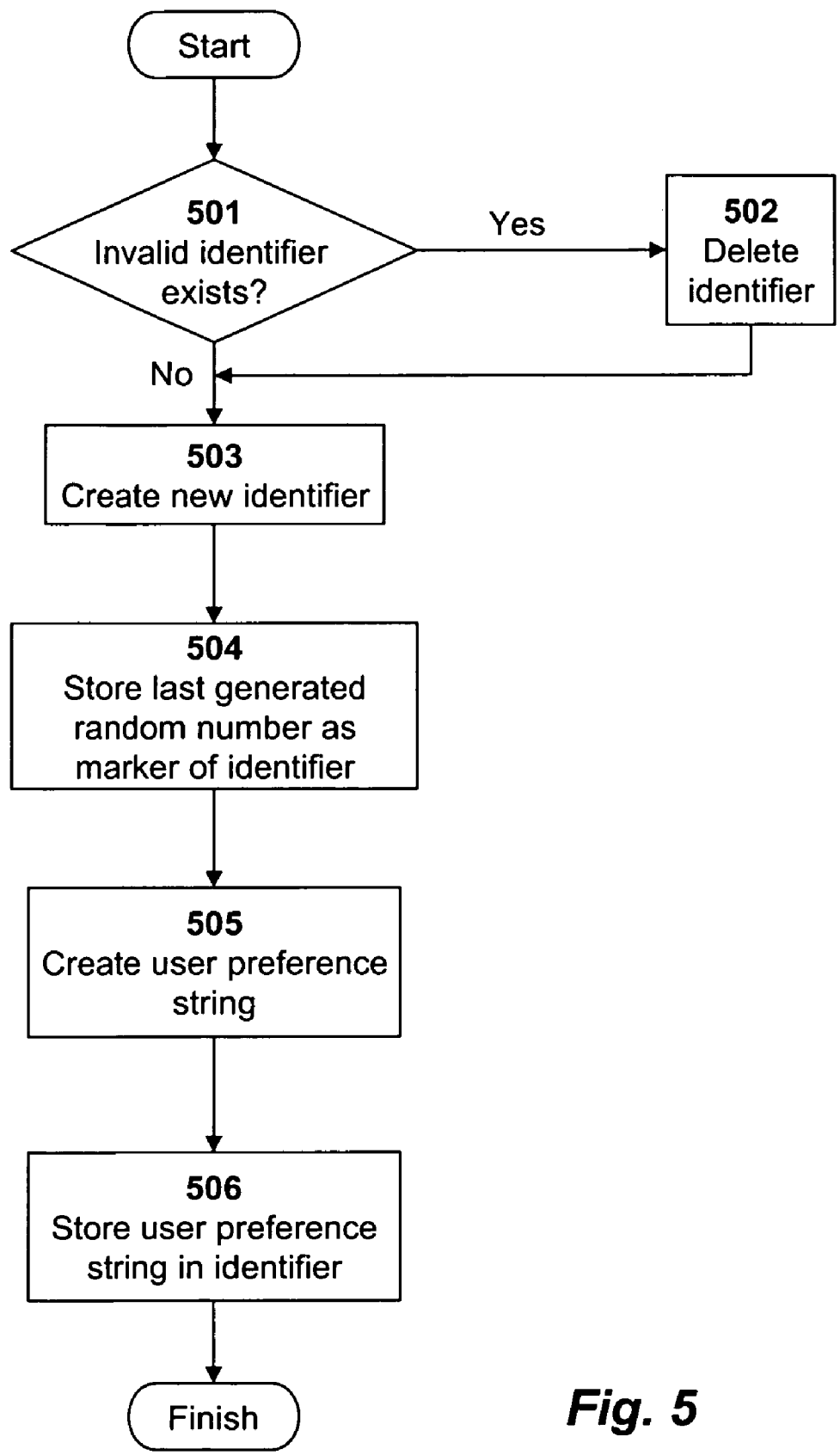
FIG. 5 illustrates one embodiment of attaching an identifier to an e-mail.

One embodiment of a method for generating the identifier 400 is illustrated in the flow-chart of FIG. 5. A new identifier 400 may be created in two situations: when an invalid identifier exists (discussed later) and when no identifier exists in the e-mail. Beginning with decision block 501, the mail handler 206 determines whether an invalid identifier exists. If so, the identifier is deleted in step 502. Proceeding to step 503, a new identifier template is created in the e-mail. In one embodiment, the template is stored in the header of the e-mail and contains reserved space for the marker 401 and the user preference string 402. Proceeding to step 504, the last generated random number of the mail handler 206 is retrieved and stored as the marker 401 of the newly created identifier 400.

In one embodiment, the mail handler 206 generates a random number every hour. Hence, when a new identifier 400 is created, the last generated random number (generated within the last hour) is stored as the marker 401. The last six generated numbers are stored in the mail handler 206, and the stored random numbers are used to compare to a marker 401 when determining if an identifier 400 is valid (as discussed below). Thus, since the mail handler 206 keeps a history of the generated random numbers for the past six hours, an identifier 400 stays valid for up to six hours. It will be recognized by one skilled in the art that a random number can be generated at any time interval and any number of generated numbers can be stored, thus affecting the expiration of identifiers 400.

Once the marker 401 is stored in the newly created identifier 400, the process moves to step 505 where a user preference string 402 is created from the user preference map (FIG. 3B). In one embodiment, the mail handler 206 requests the new user preference string from the database proxy 209. The database proxy 209 then queries the database 210 for user information needed to create the user preference string 402.

For example, in creating the string 402, the database proxy 209 may query the database 210 for field 308 (SPAM filtering) for a user to whom the e-mail is addressed to create bits 403. The remaining bits 404-407 may be generated based on the user preference results retrieved from the database 210. Once the entire user preference string 402 is created, the database proxy sends the string 402 to the mail handler 206.

In an alternate embodiment, the string 402 is already stored in the user database 210 and may therefore be transmitted in its entirety from the user database 210 to the mail handler 206. Alternatively, the mail handler 206 may create the user preference string 402 through querying the user database 210 via the database proxy 209. It will be appreciated by one skilled in the art that numerous embodiments exist in creating the string 402, and thus the scope of the present invention is not limited to the embodiments previously discussed.

Proceeding to step 506, once the mail handler 206 has the newly created user preference string 402, the string 402 is stored into the newly created identifier 400 (finalizing the creation of new identifier 400). In an alternative embodiment, only the marker 401 is deleted and replaced, and the string 402 is left unchanged when replacing an invalid identifier 400.

Figure 6:
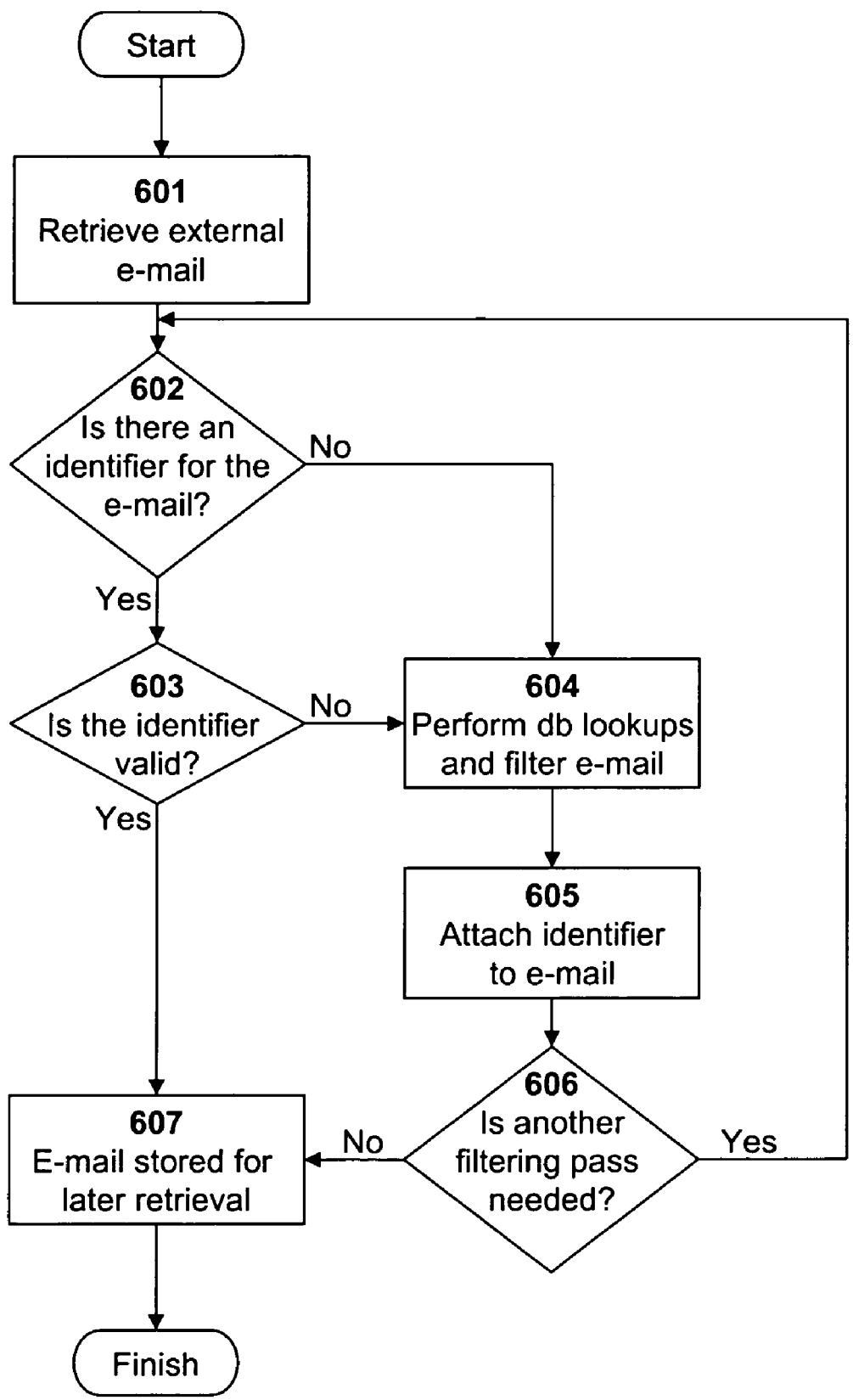
FIG. 6 is a flow-chart of the procedure for handling and transmitting received e-mails performed by the embodiment of the present invention in FIG. 2.

FIG. 6 illustrates a process for handling a new e-mail message received by the service 100. Beginning with step 601, the e-mail server 205 retrieves an e-mail from an external mail server 204 and passes the e-mail to the inbound mail handler 206. At decision block 602, the inbound mail handler 206 determines whether there exists an identifier for the current e-mail. If an identifier exists, process flows to decision block 603. In decision block 603, the inbound mail handler 206 determines whether the existing identifier for the current e-mail is valid. As previously discussed, in one embodiment, the inbound mail handler 206 compares the marker 401 (e.g., a generated random number) to the six saved markers (e.g., the last six generated random numbers) in the mail handler 206. If the marker 401 matches one of the stored markers, then the inbound mail handler 206 deems the identifier 400 valid. If the marker 401 does not match any of the stored markers, then the identifier 400 is deemed invalid.

If the identifier is valid, process flows to step 607 where the e-mail is stored in the e-mail server 205 for later retrieval. If the identifier does not exist in decision block 602 or is not valid in decision block 603, process flows to step 604.

At step 604, the e-mail is filtered by the inbound mail handler 206, as illustrated in one embodiment shown in FIG. 7. In step 605, a valid identifier is attached to the e-mail. Afterwards, in decision block 606, the inbound mail handler 205 determines whether another filtering pass is needed for the current e-mail. If another filtering pass is needed, process reverts back to decision block 602. If no other filtering is presently needed for the current e-mail, then the e-mail is stored for retrieval by the client in step 607.

In another embodiment of the present invention, the e-mail server 205 may instruct the dispatcher 208 to send a notice to the addressee of the current e-mail that a new e-mail message exists on the service 100.

Referring to FIG. 7, an example flow-chart for filtering an e-mail message (e.g., step 604 of FIG. 6) is illustrated. When step 604 of FIG. 6 is entered, flow proceeds to decision block 701 of FIG. 7 where the e-mail server 205 determines the SPAM and/or virus filtering to be performed. In one embodiment, to make this determination, the user preference mapping (FIG. 3B) of the user database 210 is queried by the inbound mail handler 206 via the database proxy 209 (e.g., entry 308 associated with a user may be read to determine the status of SPAM filtering). Other entries may disclose the level of SPAM filtering and/or virus filtering as described above. In an alternative embodiment, the inbound mail handler 206 reads the user preference string 402 in an existing identifier 400 in the e-mail to determine user preferences related to filtering.

If the inbound mail handler 206 determines virus and/or SPAM filtering is active, the process flows to step 702 where the email message is analyzed for SPAM and/or viruses. In decision block 703, the inbound mail handler 206 determines if the e-mail contains an attachment. If the e-mail does not contain an attachment, the flow-chart of FIG. 7 ends and process flows to step 603 of FIG. 6. If the e-mail contains an attachment, in block 704 the inbound mail handler 206 evaluates the user preferences to determine whether to transmit the attachment to the device 101. In one embodiment, to determine, the inbound mail handler 206 queries the user preference mapping of the user database 210 via the database proxy 209. For example, if a picture and/or video attachment exist for an e-mail addressed to Jack Lambert, entries 309 and/or 310 are read to make the determination. In an alternative embodiment, user preferences may be determined from a user preference string 402 of an existing identifier 400, where the string 402 is not deleted during step 502 when creating a new identifier.

If the user does not want the attachment, the process flows to step 705, where the attachment is removed from the e-mail and stored on the service 100. In one embodiment of the present invention, the attachment is in the user database 210. In another embodiment, the removed attachment is replaced in the e-mail with an attachment identifier corresponding to the removed attachment stored on the service 100. The attachment identifier is subsequently used by the service 100 to identify the stored attachment (e.g., for functions such as forwarding the attachment to other users or transmitting the attachment at a later time to the device 101). One embodiment of associating an identifier with an e-mail is described in co-pending application entitled A SYSTEM AND METHOD OF DISTRIBUTING A FILE BY EMAIL, Ser. No. 09/952,419, Filed Sep. 13, 2001 (hereinafter "File Distribution Application"), which is assigned to the assignee of the present application and which is incorporated herein by reference. Following step 705, the flow-chart of FIG. 7 is exited and process flows to step 603 of FIG. 6.

In one embodiment of the present invention, multiple filters may be implemented for specific tasks or in a duplicative fashion to better filter unwanted items in e-mail. Thus, the identifier 400 may be used to determine which filters or portions of the filtering are unnecessary at the present time for the current e-mail. Therefore, it should be recognized by one skilled in the art that the scope of the present invention should not be limited merely to the methods of filtering described.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although some of the embodiments described above are implemented within the context of a mobile device and service, the underlying principles of the invention may be implemented on a variety of platforms and architectures. Accordingly, the scope and spirit of the invention should be judged in terms of the claims which follow.

What is claimed is:

1. A method comprising:
    determining whether an email addressed to a user includes an identifier, the identifier comprising a first string and a second string in a header of the email, the first string including a randomly generated number that identifies the user, and the second string including information identifying one or more filtering preferences that include at least:
        an indication whether the email should be filtered for SPAM; and
        format restriction to convert image attachments to the email into a specific format with specific dimensions;
    determining whether the identifier is valid upon determining the email includes the identifier by comparing the randomly generated number of the first string to at least one stored number;
    filtering the email for SPAM when the second string indicates that the email should be filtered for SPAM; and
    converting an image attachment of the email into the specific format with the specific dimensions identified by the second string.

2. The method of claim 1 further comprising:
    retrieving the email on behalf of the user;
    attaching the identifier to the email upon filtering the email; and
    storing the email upon attaching the identifier to the email.

3. The method of claim 2 further comprising sending a notice, indicating that the email has been stored, to a device associated with the user upon storing the email.

4. The method of claim 1, further comprising:
    storing the attachment of the email; and
    removing the attachment from the email.

5. The method of claim 1, wherein the specific dimensions comprise a height and a width of the image attachments.

6. An email server, comprising: a processor; computer readable hardware storage media having stored thereon a mail handler as computer executable instructions that, when executed by the processor, initiate the mail handler to: determine if an email addressed to a user includes an identifier, the identifier comprising a first string and a second string in a header of the email, the first string including a randomly generated number that identifies the user, and the second string including information identifying one or more filtering preferences that include at least: an indication whether the email should be filtered for SPAM; and a format restriction to convert images of the email into a specific format with specific dimensions; determine whether the identifier is valid if the email includes the identifier by comparing the randomly generated number of the first string to at least one stored number; filter the email for SPAM when the second string indicates that the email should be filtered for SPAM; and convert an image attachment of the email into the specific format with the specific dimensions identified by the second string.

7. The email server of claim 6, wherein the executable instructions send a notice, indicating that the email has been stored, to a device associated with the user upon storing the email.

8. The email server of claim 6, wherein the specific dimensions comprise a height and a width of the image attachments.

9. Computer readable hardware storage media having stored thereon computer executable instructions, that, when executed by a processor, provide a method comprising: determining if an email addressed to a user includes an identifier, the identifier comprising a first string and a second string in a header of the email, the first string including a randomly generated number that identifies the user, and the second string including information identifying one or more filtering preferences that include at least: an indication whether the email should be filtered for SPAM; and a format restriction to convert images of the email into a specific format with specific dimensions; determining whether the identifier is valid if the email includes the identifier by comparing the randomly generated number of the first string to at least one stored number; filtering the email for SPAM when the second string indicates that the email should be filtered for SPAM; and converting an image attachment of the email into the specific format with the specific dimensions identified by the second string.

10. The computer readable hardware storage media of claim 9 further comprising computer executable instructions, that when executed by the processor, provide a method comprising: retrieving the email from an email server on behalf of the user; attaching the identifier to the email upon filtering the email; and storing the email upon attaching the identifier to the email.

11. The computer readable hardware storage media of claim 10 further comprising computer executable instructions, that when executed by the processor, provide a method comprising sending a notice, indicating that the email has been stored, to a device associated with the user upon storing the email.

12. The email computer readable hardware storage media of claim 9, further comprising computer executable instructions, that when executed by the processor, provide a method comprising: storing the attachment of the email; and removing the attachment from the email.

13. The computer readable hardware storage media of claim 9, wherein the specific dimensions comprise a height and a width of the image attachments.

* * * * *